Figure 1:
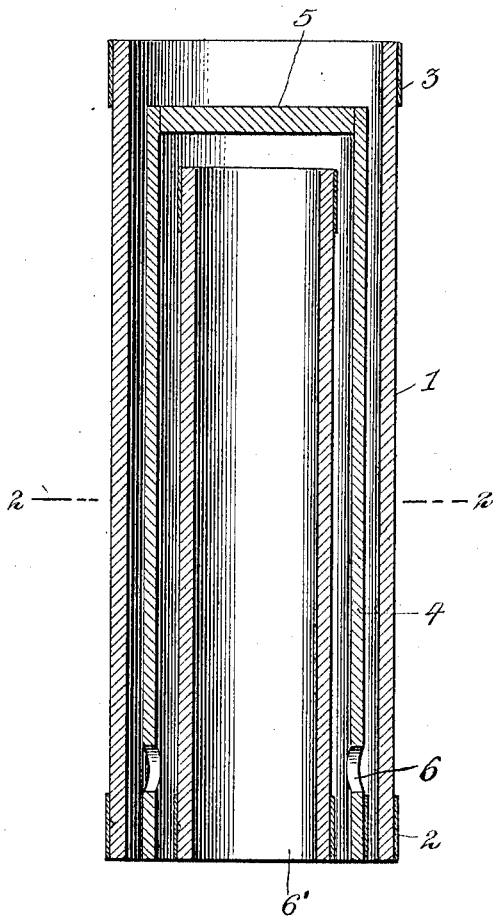

G. A. EVANS.
VAPORIZER.
APPLICATION FILED JUNE 29, 1912.

1,048,399.

Patented Dec. 24, 1912.

WITNESSES
Geo. Naylor
A. L. Kitchin.

INVENTOR
George A. Evans
BY Munn & Co.
ATTORNEYS

UNITED STATES PATENT OFFICE.

GEORGE A. EVANS, OF NEW YORK, N. Y.

VAPORIZER.

1,048,399.

Specification of Letters Patent. Patented Dec. 24, 1912.

Application filed June 29, 1912. Serial No. 706,580.

*To all whom it may concern:*

Be it known that I, GEORGE A. EVANS, a citizen of the United States, and a resident of the city of New York, borough of Brooklyn, in the county of Kings and State of New York, have invented a new and Improved Vaporizer, of which the following is a full, clear, and exact description.

This invention relates to improvements in vaporizers, and has for an object to provide an improved structure which may be used for giving off, or in a certain sense exhaling particles of medicinal substances through air passed thereover so that the medicinally charged air may be used for the treatment of diseases of the lungs and air passages.

A further object of the invention is to prepare a wood or other fibrous material so that the same is impregnated with a liquid or solid medicinal substance capable of being taken off or vaporized by air passing thereover.

A still further object of the invention is the process of forming an inhaler or vaporizer by extracting therefrom liquid matter, resinous matter, and similar substances, and then substituting a medicinal or chemical substance or preparation which may be taken off by air passing over the inhaler or vaporizer.

In carrying out the objects of the invention, one or more bodies of fibrous material is used, preferably formed hollow so that air may pass over a comparatively large surface in a comparatively small cubic area. The wood or other fibrous material is treated so that the resinous matter and water or liquid matter is removed, after which a liquid or solid medicinal substance is inserted or forced into the wood or other fibrous material for use in the treatment of diseases of the air passages or lungs by inhalation, the air passing over the wood or fibrous impregnated member being provided with a supply of a proper chemical substance. In constructing the device it is contemplated that the same may be used to dissipate offensive odors by deodorization, and to vaporize or change liquid or solid substances into a vaporous or gaseous state for the production of light, or the purpose of combustion, or for other purposes, as desired. Any liquid or solid substance that can be vaporized or changed to a vaporous or gaseous state at ordinary temperatures by passing a current of air over a large evaporation surface impregnated with the substance to be vaporized, may be used in this vaporizer, which is of course not restricted to any particular shape or size, though the same is preferably arranged cylindrical in shape and in groups or series with an opening in each alternate member so that air may pass back and forth through all of the members and become impregnated or saturated with a medicinal substance by reason of passing over a large area.

A practical embodiment of the invention is represented in the accompanying drawings forming a part of this specification, in which similar characters of reference indicate corresponding parts in all the views.

Figure 2:
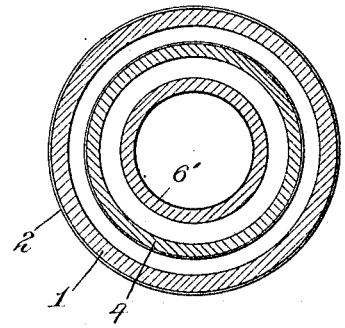

Figure 1 is a longitudinal vertical section through a concrete embodiment of the invention; Fig. 2 is a section through Fig. 1 on the line 2—2; and Fig. 3 is an enlarged fragmentary sectional view through a part of one of the walls of one of the members shown in Fig. 1.

Referring to the accompanying drawings by numerals, 1 indicates a tubular member formed of wood and provided with metallic bands 2 and 3 for holding the same properly in shape. It will be evident that instead of using wood, vegetable fiber of any kind may be used, which when used is preferably associated with braided or interwoven metal to preserve the shape and form during the process of preparation and impregnation. Arranged in the tubular member 1 is a second tubular or cylindrical member 4, having a closed top 5 and a plurality of openings 6 near the bottom. Within the tubular member 4 is another or third tubular member 6' open at the top and bottom similar to the tubular member 1, the same being also provided with tubular rings at the top and bottom, while the member 4 is provided with a ring preferably only at the bottom. These various tubes are preferably formed of porous wood from which the sap, resinous matter, and the like has been removed by any desired means, as for instance, steam or boiling water, after which the tubes are thoroughly dried by any means, as for instance, passing heated air thereover. After the tubes have been prepared in this manner, a medicinal preparation is forced into the wood to take the place of the sap and resinous matter removed therefrom, this preparation being forced into the wood while in a liquid state, to be later changed to a vaporous or gaseous state by passing air over the impregnated or saturated wood.

It will be evident that one or a large number of the tubes may be used at one time, the larger number of tubes used giving, of course, a larger area over which the air passes within a minimum space or area.

Figure 3:
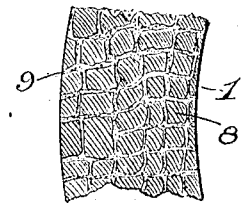

As shown in Fig. 3, the wood or other fibrous material of which the tubes may be made is formed with comparatively solid portions 8 and resinous or liquid portions 9. The liquid portion 9 is adapted to be removed and a medicinal preparation substituted so that when the vaporizer is completed the same will have the same general shape and appearance as the original wood or fiber.

When using the vaporizer, the same is inclosed in a housing or receptacle of any kind, through which air may be drawn so that the air will pass over the surface of the various cylinders or tubular members in order to become more or less saturated with the medicinal preparation. If the inhaler is to be used for other purposes than inhaling into the lungs, air may be forced into one end and consequently forced out the other rather than drawn in by the action of the mouth and lungs.

Having thus described my invention I claim as new and desire to secure by Letters Patent:—

1. A vaporizer comprising a nested arrangement of tubular members, no two members being of the same height nor having the same transverse diameter, each alternate member having one end closed and apertures near the end opposite the closed end, and each alternate member having both ends open, said members being disposed or arranged one within another whereby air may pass in a tortuous continuous passage through all the channels within and between the nested members, each of said members being impregnated with a medicinal substance which is adapted to be vaporized by air passing thereover.

2. A vaporizer comprising a nested arrangement of tubular wood members, no two members having the same transverse and vertical dimensions, every other member having one end closed and apertures near the end opposite the closed end, and each alternate member having both ends open, said members being disposed or arranged one within the other to form a continuous tortuous air passage, a metal band for each of said members for preserving the shape and size of the said members, each of said members being impregnated with a medicinal substance which is adapted to be vaporized by air passing thereover.

3. A vaporizer comprising a nested arrangement of tubular members, no two members having the same transverse or vertical dimensions, each alternate member having one end closed and apertures near the end opposite the closed end, in addition to, but independent of its terminal opening or mouth, and each alternate member having both ends open, said members being disposed or arranged one within the other to form a continuous tortuous air passageway, each of said members being composed of wood having the pores thereof filled with a volatile medicinal preparation which is adapted to be vaporized by air passing thereover.

4. A vaporizer comprising a nested arrangement of tubular members composed of wood, provided with bands of metal to preserve the size and shape of said members, no two members having the same transverse or vertical dimensions, each alternate member having one end closed and apertures near the end opposite the closed end, and each alternate member having both ends open, said members being disposed or arranged one within another whereby air may pass in a tortuous continuous passage through all the channels within and between the nested members, said members having the pores thereof filled with a volatile medicinal preparation which is adapted to be vaporized by air passing thereover.

5. A vaporizer comprising concentrically arranged tubes of different sizes, said tubes regularly diminishing in size from the outer tube to the inner tube, the outer tube being formed open at both ends, the second tube from the outer tube being formed open at one end and closed at the opposite end, said last mentioned tube being formed with radiating apertures near the open end, the third tube being open at both ends, the succeeding tubes being arranged in a similar manner to the series just referred to, and a metallic retaining band arranged at one end of each of said tubes for causing the same to retain their shape and size during the action of saturation and evaporation.

In testimony whereof I have signed my name to this specification in the presence of two subscribing witnesses.

GEORGE A. EVANS.

Witnesses:
A. L. KITCHIN,
PHILIP D. ROLLHAUS.

---

Copies of this patent may be obtained for five cents each, by addressing the "Commissioner of Patents, Washington, D. C."